United States Patent Office 3,291,792
Patented Dec. 13, 1966

3,291,792
ACETALS AND KETALS OF 15α,16α-DIHYDROXYPROGESTERONE
Samuel C. Pan, Metuchen, and Pacifico A. Principe, South River, N.J., assignors, by mesne assignments, to E. R. Squibb & Sons, Inc., New York, N.Y., a corporation of Delaware
No Drawing. Filed Dec. 14, 1964, Ser. No. 418,344
5 Claims. (Cl. 260—239.55)

This invention relates to, and has for its objects, the provisions of new physiologically active steroids and a new intermediate useful in the preparation of the same.

The final products of this invention are steroids which are 15,16-acetal and ketal derivatives of 15α,16α-dihydroxyprogesterone of the general formula

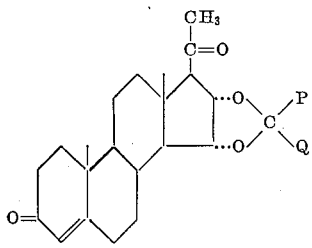

wherein P is hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; Q is lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; or together with the carbon to which they are joined P and Q is a monocyclic cycloalkyl or monocyclic heterocyclic radical.

The final products of this invention are physiologically active substances which possess anti-androgenic activity, i.e., they inhibit the action of androgens, and they can be used in the treatment of such conditions as hyperandrogenic acne. The compounds may be formulated for such administration, the concentration and/or dosage being based on the activity of the particular compound and the requirements of the patient.

The final products of this invention can be prepared by reacting 15α,16α - dihydroxyprogesterone, which is prepared by subjecting 15α-hydroxyprogesterone to the enzymes of a 16α-hydroxylating microorganism, such as Streptomyces roseochromogenes, with an aldehyde or ketone of the formula:

wherein P and Q are as hereinbefore defined. The reaction is preferably carried out by treating a suspension or solution of the dihydroxy steroid in the aldehyde or ketone (or an organic solvent and the aldehyde or ketone, if the aldehyde or ketone is a solid) with an acid catalyst (e.g., perchloric acid, p-toluenesulfonic acid, hydrochloric acid, etc.), neutralizing the acid and recovering the acetal or ketal derivative formed.

Suitable aldehyde and ketone reactants include lower alkanals of at least two carbon atoms, such as paraldehyde, propanal and hexanal; di(lower alkyl)-ketones, such as acetone, diethylketone, dibutylketone, methylethylketone, and methylisobutylketone; cycloalkanones, such as cyclobutanone, cyclopentanone, cyclohexanone, suberone, and cyclodecanone; cycloalkyl (lower alkanals), such as cyclopropylcarboxaldehyde, cyclobutylcarboxaldehyde, cyclopentylcarboxaldehyde, cyclohexylcarboxaldehyde, cycloheptylcarboxaldehyde, cyclooctylcarboxaldehyde, cyclocpropylacetaldehyde, cyclobutylacetaldehyde, cyclopentylacetaldehyde, cyclohexylacetaldehyde, β - cyclopentylpropionaldehyde, γ - cyclohexylbutyraldehyde, and 3-cyclopropylcaproaldehyde; cycloalkyl(lower alkanones), such as cyclopropyl methyl ketone, cyclobutyl ethyl ketone, cyclopentyl propyl ketone, cyclopentylmethyl methyl ketone, cyclohexylmethyl ethyl ketone, cyclopentylethyl ethyl ketone, cyclopropylpropyl methyl ketone, cyclohexyl n-pentyl ketone, cyclohexyl methyl ketone, and cyclooctyl methyl ketone; dicyclo alkyl ketones, such as dicyclopropyl ketone, dicyclobutyl ketone, dicyclopentyl ketone, dicyclohexyl ketone, cyclopentyl cyclohexyl ketone, cyclopropylmethyl cyclopropyl ketone, 2-cyclobutylethyl cyclopropyl ketone, 3-cyclopentylmethyl cyclopentyl ketone, 5-cyclohexylhexyl cyclohexyl ketone, di(cyclopentylmethyl) ketone, cyclohexylmethyl cyclopentyl ketone, and di(4-cyclohexylpentyl) ketone; cycloalkyl monocyclic aromatic ketones, such as cyclopropyl phenyl ketone, cyclohexyl p-chlorophenyl ketone, cyclopentyl o-methoxyphenyl ketone, cyclopentyl o,p-dihydroxyphenyl ketone, cyclohexyl m-tolyl ketone, cyclopropyl p-ethylphenyl ketone cyclopropyl p-nitrophenyl ketone, and cyclohexyl p-acetamidophenyl ketone; cycloalkyl(lower alkyl) monocyclic aromatic ketones, such as cyclopentylmethyl phenyl ketone; cycloalkyl monocyclic aromatic(lower alkyl) ketones, such as cyclopentyl benzyl ketone, cyclohexyl phenethyl ketone, and cyclobutyl benzyl ketone; cycloalkyl(lower alkyl) monocyclic aromatic(lower alkyl) ketones, such as cyclopentylmethyl benzyl ketones; cycloalkyl monocyclic heterocyclic ketones, such as cyclopentyl 2-furyl ketone, cyclohexyl 2-thienyl ketone, and cyclopropyl 2-pyridinyl ketone; cycloalkyl (lower alkyl) monocyclic hereocyclic ketones, such as cyclopentylmethyl 2-piperidinyl ketone, cyclohexylethyl 2-morpholinyl ketone and cyclopropyl 2-thienyl ketone; cycloalkyl monocyclic heterocyclic (lower alkyl) ketones, such as cyclopentyl thenyl ketone, cyclohexyl furfuryl ketone and cyclopropyl 2-piperidinylmethyl ketone; halo-lower alkanals, such as chloral hydrate, trifluoroacetaldehyde hemiacetal, and heptafluorobutanol ethyl hemiacetal; halo-lower alkanones, such as 1,1,1-trifluoroacetone; monocyclic carbocyclic aromatic aldehydes, such as benzaldehyde, halobenzaldehyde (e.g. p-chlorobenzaldehyde and p-fluorobenzaldehyde), lower alkoxybenzaldehydes (e.g. o-anisaldehyde), di(lower alkoxy)benzaldehydes (e.g. veratraldehyde), hydroxybenzaldehydes (e.g. salicylaldehyde), dihydroxybenzaldehydes (e.g. resorcyaldehyde), lower alkyl benzaldehydes (e.g. m-tolualdehyde and p-ethylbenzaldehyde), di(lower alkyl)benzaldehydes (e.g. o,p-dimethylbenzaldehyde), nitrobenzaldehydes, acylamidobenzaldehydes (e.g. N-acetylanthranilaldehyde), and cyanobenzaldehydes; monocyclic carboxylic aromatic lower alkanals, such as phenylacetaldehyde, α-phenylpropionaldehyde, β-phenylpropionaldehyde, γ-phenylbutyraldehyde, and aromatically-substituted halo lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives thereof; monocyclic heterocyclic lower alkanals; monocyclic carbocyclic aromatic ketones, such as acetophenone, α,α,α - trifluoroacetophenone, propiophenone, butyrophenone, valerophenone, isocaprophenone, halophenyl lower alkyl ketones (e.g. p-chloroacetophenone and p-chloropropiophenone), (lower alkoxy) phenyl lower alkyl ketones (e.g. p-anisyl methyl ketone), di (lower alkoxy)phenyl lower alkyl ketones, hydroxyphenyl lower alkyl ketones, dihydroxyphenyl lower alkyl ketones (e.g. resacetophenone), (lower alkyl)phenyl lower alkyl ketones (e.g. methyl p-tolyl ketone), di (lower alkyl)-phenyl lower alkyl ketones (o,p-xylyl methyl ketone), nitrophenyl lower alkyl ketones (e.g. p-nitroacetophenone), acylamidophenyl lower alkyl ketones (e.g. acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones such as 1-phenyl-3-butanone and 1-phenyl-4-pentanone, and aromatically substituted derivatives thereof; monocyclic heterocyclic ketones, such as 2-acetylfuran, 2-benzoylfuran, 2-acetyl-thiophene and alloxan; and monocyclic heterocyclic lower alkonones.

The following examples illustrate the invention (all temperatures being in centigrade):

EXAMPLE 1

*15α,16α-dihydroprogesterone*

Surface growth from each of two 2-week-old agar slants of *Streptomyces roseochromogenes* (Waksman No. 3689, The Institute of Microbiology, Rutgers University, New Brunswick, New Jersey), the slants containing as a nutrient medium (A):

| | Grams |
|---|---|
| Glucose | 10 |
| Yeast extract | 2.5 |
| $K_2HPO_4$ | 1 |
| Agar | 20 |
| Distilled water to 1 liter. | | is suspended in 5 ml. of 0.01% sodium lauryl sulfate aqueous solution. One ml. portions of this suspension are used to inoculate nine 250 ml. Erlenmeyer flasks, each containing 50 ml. of the following sterilized medium (B):

| | Grams |
|---|---|
| Glucose | 30 |
| Soy bean meal | 20 |
| Soy bean oil | 2.2 |
| $CaCO_3$ | 2.5 |
| Distilled water to 1 liter. | |

After 72 hours incubation at 25° with continuous rotary agitation (280 cycles per minute; 2 inch radius), 10% (vol./vol.) transfers are made to 50 250 ml. Erlenmeyer flasks, each containing 50 ml. of freshly sterilized medium B plus 200 micrograms/ml. of 15α-hydroxyprogesterone. The steroid is added by supplementing each flask with 0.25 ml. of a sterile solution of the steroid in N, N-dimethylformamide containing 40 mg./ml. of steroid. A total of 485 mg. is fermented. After 72 hours of further incubation, using the same conditions as described above, the broths are harvested.

The combined broth is extracted three times with 500 ml. portions of chloroform. The chloroform extract is concentrated down to a syrup under vacuum. The syrup is chromatographed on thin layer plates, using silica gel GF (E. Merck, AG) as adsorbent and ethyl acetate as the developing solvent. The major band is eluted with a 1:1 (by vol.) mixture of methanol and chloroform. The eluate is partitioned between chloroform and a mixture of 1:1 (by vol.) mixture of methanol and water. The chloroform phase is dried over anhydrous sodium sulfate and evaporated down under vacuum to dryness to yield crude crystals of 15α,16α-dihydroxyprogesterone. It is recrystallized from acetone-n-hexane. Yield about 120 mg., M.P. 192–193°.

$\lambda_{max}^{alc.}$ 241 mμ ($\epsilon$=16,000); $\lambda_{max}^{CHCl_3}$ 2.85, 2.9, 5.86, 6.02, 6.18μ

*Analysis.*—Calc'd for $C_{21}H_{30}O_4$: C, 72.80; H, 8.72. Found: C, 72.74; H, 8.75.

EXAMPLE 2

*15α,16α-dihydroxyprogesterone acetonide*

To a solution of 70 mg. of 15α,16α-dihydroxyprogesterone in 10 ml. of acetone, 0.1 ml. of a 30% aqueous perchloric acid solution is added. This reaction mixture is allowed to stand at room temperature overnight. It is then treated with 10 ml. of an aqueous 0.1 M $NaHCO_3$ solution and the steroid is extracted into 25 ml. of chloroform. The chloroform extract, after being dried over anhydrous sodium sulfate, is evaporated under vacuum down to dryness to yield crude crystals of 15α,16α-dihydroxyprogesterone 15α,16α-acetonide. It is recrystallized from acetone-n-hexane. Yield 40 mg., M.P. 191–191.5°.

$\lambda_{max}^{alc.}$ 241 mμ ($\epsilon$=16,000); $\lambda_{max}^{Nujol}$ 5.83, 5.96, 6.14μ

*Analysis.*—Calc'd for $C_{24}H_{34}O_4$: C, 74.57; H, 8.86. Found: C, 74.53; H, 8.86.

EXAMPLE 3

*15α,16α-dihydroxyprogesterone acetophenonide*

Following exactly the procedure of Example 1 but substituting acetophenone for the acetone, 15α,16α-dihydroxyprogesterone 15α - 16α - acetophenonide is formed.

EXAMPLE 4

*15α,16α-chloral derivatives of 15α,16α-dihydroxyprogesterone*

Following the procedure of Example 2 but substituting an equivalent amount of chloral for the acetone, the 15α,16α-chloral derivative of 15α,16α-dihydroxyprogesterone is obtained.

EXAMPLE 5

*Dicyclopropyl ketone derivative of 15α,16α-dihydroxyprogesterone*

Following the procedure of Example 2 but substituting an equivalent amount of dicyclopropyl ketone for the acetone, the dicyclopropyl ketone derivative of 15α,16α-dihydroxyprogesterone is obtained.

Similarly, the methylisobutyl ketone, cyclopropyl phenyl ketone, cyclohexyl methyl ketone, 1,1,1-trifluoroacetone, heptafluorobutanal, p-chloroacetophenone, p-nitroacetophenone, benzaldehyde, furfural benzophenone, and 2-acetylfuran yield the methylisobutyl ketone, the cyclopropyl phenyl ketone, the cyclohexyl methyl ketone, the 1,1,1-trifluoroacetonide, the heptafluorobutanal, the p-chloroacetophenone, the p-nitroacetophenone, the benzaldehyde, the furfural, the benzophenone and the 2-acetylfuran derivatives of 15α,16α-dihydroxyprogesterone, respectively.

The invention may be variously otherwise embodied within the scope of the appended claims.

What is claimed is:
1. A steroid of the formula

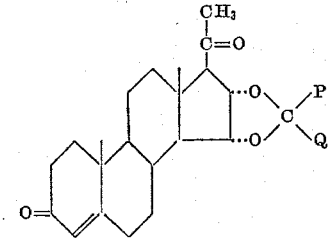

wherein P is selected from the group consisting of hydrogen, lower alkyl, halo, lower alkyl, monocyclic cycloalkyl, monocyclic cycloalkyl lower alkyl, monocyclic aryl, monocyclic aryl lower alkyl, monocyclic heterocyclic and monocyclic heterocylic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocylic lower alkyl; and together with the carbon to which they are joined P and Q is selected from the group consisting of monocyclic cycloalkyl and monocyclic heterocyclic.

2. 15α,16α-lower alkylidenedioxyprogesterone, wherein the alkylidene radical contains at least two carbon atoms.

3. 15α,16α-dihydroxyprogesterone acetonide.

4. 15α16α-phenyl(lower alkylidenedioxy)progesterone.

5. 15α,16α-dihydroxyprogesterone acetophenonide.

References Cited by the Examiner

UNITED STATES PATENTS

| | | | |
|---|---|---|---|
| 2,753,290 | 7/1956 | Fried et al. | 195—51 |
| 2,855,343 | 10/1958 | Fried et al. | 195—51 |
| 3,098,796 | 7/1963 | Laskin | 195—51 |
| 3,123,601 | 3/1964 | Diassi | 260—239.55 |

LEWIS GOTTS, *Primary Examiner.*

H. A. FRENCH, *Assistant Examiner.*